Patented Jan. 8, 1952

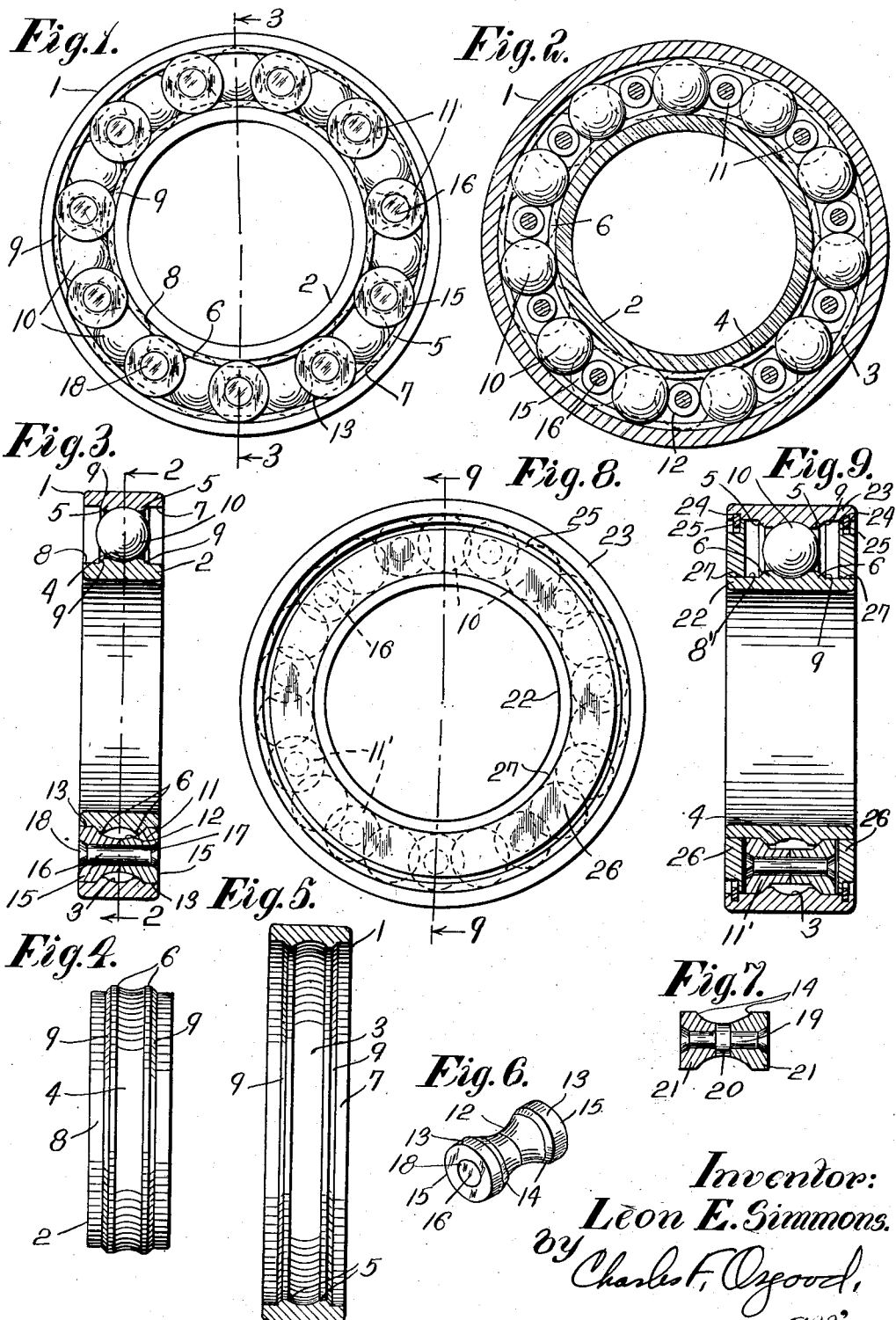
Jan. 8, 1952 — L. E. SIMMONS — 2,581,722
ANTIFRICTION BEARING
Filed June 12, 1946
Inventor:
Leon E. Simmons.
By Charles F. Osgood,
atty.

2,581,722

UNITED STATES PATENT OFFICE 2,581,722

ANTIFRICTION BEARING

Leon E. Simmons, Claremont, N. H., assignor to Joy Manufacturing Company, a corporation of Pennsylvania Application June 12, 1946, Serial No. 676,205

9 Claims. (Cl. 308—206)

This invention relates to anti-friction bearings and more particularly to improvements in an anti-friction bearing of the combined radial and axial thrust type having greater radial load carrying capacity than a conventional bearing of a given size.

Conventional anti-friction bearings are usually either of the ball or roller type, and while roller type bearings having the roller axes in parallelism are capable of carrying substantial radial loads, they are capable of carrying substantially no axial thrust loads. In ball type bearings of the radial and axial thrust type, the radial load carrying capacity is limited for a bearing of a given size so that when heavy radial loads are encountered, it is necessary to increase the bearing size or to provide an additional bearing or bearings to make adequate provision for the increased radial loads. By combining the two types of anti-friction bearings, it is possible to carry both axial thrust loads and greater radial loads. Known attempts have been made to provide a combined ball and roller type anti-friction bearing both for taking axial thrust and for carrying greater radial loads, and the present invention contemplates improvements over such known combined ball and roller bearings.

The present invention consists of an improved combined radial and axial thrust type anti-friction bearing wherein the bearing elements are arranged and constructed so that the bearing may carry not only axial thrust loads but also much greater radial loads than a conventional bearing of a given size. The invention, in a preferred embodiment, consists of a combined ball and roller bearing for carrying radial and axial thrust loads and having inner and outer bearing sleeves or rings providing raceways and having associated therewith balls and rollers constructed and arranged in a novel manner whereby the carrying of greatly increased radial loads is possible without increasing the external dimensions of a conventional anti-friction bearing of a given size. In a preferred embodiment, the balls and rollers are of the same diameter so that they revolve at the same speeds and are arranged with the rollers grooved to receive the balls so that a greater distribution of load receiving points is possible without increasing the external dimensions. The inner and outer race members, in a preferred embodiment, have annular side shoulders providing a trackway for the rollers so that improved roller alignment is possible. Both the balls and the rollers engage the raceway-providing surfaces of the inner and outer bearing sleeves and the balls may contact intermediate points on the rollers although slight clearances are present. The rollers are circumferentially grooved between their ends to provide recesses to receive the balls and to provide circular end bearing surfaces, and the rollers are desirably made in separable parts secured together in a suitable manner as by a rivet. Thus by constructing and arranging the parts in the manner outlined, extreme compactness is retained while the radial load carrying capacity of the bearing is greatly increased over a bearing of the size interchangeable with anti-friction bearings now in common use.

It is accordingly an object of the present invention to provide an improved anti-friction bearing of the combined radial and axial thrust type having greater radial load carrying capacity than conventional bearings of a given size. Another object is to provide an improved anti-friction bearing of the combined ball and roller type having the same external dimensions as anti-friction bearings now in common use. A further object is to provide an improved radial and axial thrust bearing of the combined ball and roller type having the balls and rollers arranged and constructed in an improved manner whereby greater radial load carrying capacity is attained while retaining equal axial thrust carrying capacity of conventional ball bearings. Still another object is to provide an improved anti-friction bearing of the ball and roller type whereby the ball races of the bearing provide a trackway for the rollers, thereby assuring proper alignment of the rollers. A still further object is to provide an improved ball and roller bearing wherein the rollers are circumferentially grooved intermediate their ends to receive the balls so that an increased number of radial load distributing points about the inner and outer races of the bearing is attained. Yet another object is to provide an improved bearing roller. Still another object is to provide an improved anti-friction bearing having an improved combination and arrangement of parts. Another object is to provide an improved ball and roller bearing of the cageless type. These and other objects and advantages of the invention will, however, hereinafter more fully appear.

In the accompanying drawing there are shown for purposes of illustration two forms and a modification which the invention may assume in practice.

In this drawing:

Fig. 1 is a front elevational view of a preferred illustrative form of the improved anti-friction bearing.

Fig. 2 is a sectional view taken substantially on line 2—2 of Fig. 3 and illustrating the improved ball and roller arrangement.

Fig. 3 is a cross-sectional view taken substantially on line 3—3 of Fig. 1.

Fig. 4 is a side elevational view of the inner bearing sleeve showing the inner raceway.

Fig. 5 is a cross-sectional view through the outer bearing sleeve showing the outer raceway.

Fig. 6 is a perspective view of one of the bearing rollers.

Fig. 7 is a longitudinal sectional view taken through a bearing roller of a modified construction.

Fig. 8 is a side elevational view of another illustrative form of the improved bearing.

Fig. 9 is a cross-sectional view taken substantially on line 9—9 of Fig. 8.

In Figs. 1 to 6 inclusive, illustrating the preferred illustrative embodiment, there is shown a combined radial and axial thrust bearing comprising an outer circular sleeve or outer race ring 1 and an inner circular bearing sleeve or inner race ring 2, and these sleeves or rings are concentrically arranged in the manner shown. The outer ring has an internal raceway groove 3 while the inner ring has an outer raceway groove 4, and these raceway grooves respectively have annular side shoulders or abutments 5, 5 and 6, 6 projecting from the inner and outer cylindric surfaces 7 and 8 of the sleeves respectively. These side raceway shoulders are beveled at 9 at their outer sides for a purpose to be later explained. A series of balls 10 is received in the raceway grooves 3 and 4 and are herein preferably eleven in number, but it will be evident that balls of a smaller or larger number may be used. These balls are arranged in alternation with an equal number of rollers 11. The rollers are circumferentially grooved at 12 intermediate their ends and the end portions of the rollers at the opposite sides of the grooves provide circular bearing surfaces 13 at the opposite sides of the balls. The balls and rollers are of the same diameter, and the circular end bearing surfaces 13 of the rollers engage the inner and outer peripheral surfaces 7 and 8 of the bearing sleeves at the outer sides of the ball raceway grooves. The rollers are beveled at 14 at the inner sides of the circular inner bearing surfaces, and these beveled surfaces contact the beveled surfaces 5, 5 and 6, 6 of the annular side shoulders of the ball raceways so that the annular side shoulders provide a trackway for the rollers to assure proper alignment of the latter. The balls may contact the rollers at intermediate points at the bottoms of the annular roller grooves although slight clearances are present, and the annular grooves in the rollers are shaped substantially to correspond, with slight clearances, to the spherical exterior surfaces of the balls. The rollers are herein preferably made in identical separate parts 15, 15, held together by a rivet 16 received in axial bores 17 in the roller parts. The ends of the rivets are headed over at 18 in countersunk recesses at the ends of the rollers. This separable roller construction is necessary to permit assembly of the balls and rollers in the bearing sleeves. In the modification shown in Fig. 7, the rivet 19 has a central circular enlargement 20 arranged between relatively short roller parts 21, 21. Thus by associating the rollers with the balls in the extremely compact manner disclosed, a greater number of radial load distributing points are provided, resulting in a bearing having a substantially increased radial load carrying capacity while retaining the axial thrust carrying capacity and without increasing the external dimensions of the bearing over those of a conventional type.

In the form of the invention shown in Figs. 8 and 9, the ball and roller arrangement and construction are similar to those above described, although the rollers 11' are of slightly different external configuration. In this instance, however, the inner and outer bearing sleeves 22 and 23 are relatively elongated and the outer sleeve is internally grooved at 24, 24 near its opposite ends at the outer sides of the trackway for the rollers. Received in these grooves are conventional snap rings 25 for holding in position within the opposite sides of the bearing annular closure plates or seals 26 which have a close fit at 27 with the exterior periphery 8' of the inner bearing sleeve. These closure plates are composed of porous material herein preferably molded sintered powdered metal of the kind known as "Oilite." These "Oilite" rings serve to keep out dirt from the internal bearing structure while permitting restricted flow of lubricant to the internal bearing structure when the bearing is submerged in a lubricant bath. It will be evident that these closure plates may be constituted of other porous metal or other porous material having characteristics similar to "Oilite." Thus a dirt-proof, porous closure is provided for the bearing while attaining adequate lubrication. The width of the bearing of this modified form is substantially no greater than the width of a conventional closure-type roller bearing. The manners of application and advantages of the improved anti-friction bearing will be clearly apparent to those skilled in the art.

While there are in this application specifically described two forms and a modification which the invention may assume in practice, it will be understood that these forms and modification of the same are shown for purposes of illustration and that the invention may be further modified and embodied in various other forms without departing from its spirit or the scope of the appended claims.

What I claim as new and desire to secure by Letters Patent is:

1. In an anti-friction bearing, the combination comprising inner and outer concentric bearing sleeves respectively having outer and inner annular grooves providing raceways, said grooves having annular shoulders at the sides thereof provided with oppositely inclined outer beveled surfaces, balls arranged in the raceways provided by said grooves, and rollers arranged in alternation with said balls and circumferentially grooved to receive said balls, said rollers having oppositely inclined inner beveled surfaces at the sides of the grooves therein and engaging the beveled surfaces of said side shoulders to assure proper alignment of said rollers.

2. In an anti-friction bearing, the combination comprising inner and outer concentric bearing sleeves, said inner sleeve having an outer raceway groove and said outer sleeve having an inner raceway groove, said grooves having annular outwardly facing beveled shoulders at the sides thereof, balls arranged in said grooves between said sleeves, and rollers arranged between said sleeves in alternation with said balls and having inwardly facing beveled surfaces engaging said beveled shoulders at the opposite sides of said grooves, and said shoulders providing a trackway for said rollers to assure proper alignment of the latter with respect to said balls.

3. In an anti-friction bearing, the combination comprising inner and outer concentric bearing sleeves, said inner sleeve having an outer raceway groove and said outer sleeve having an inner raceway groove, said grooves having annular outwardly facing beveled shoulders at the sides thereof, balls arranged in said grooves between said sleeves, and rollers arranged between said sleeves in alternation with said balls and circumferentially grooved intermediate the ends thereof to receive said balls and having circular end bearing surfaces at the outer sides of the grooves thereof, said circular end bearing surfaces of said rollers having inwardly facing beveled surfaces at their inner sides engaging said beveled shoulders, and said shoulders providing a trackway for said rollers to assure proper alignment of the latter with respect to said balls.

4. In an anti-friction bearing, the combination comprising inner and outer concentric bearing sleeves, said inner sleeve having an outer raceway and said outer sleeve having an inner raceway, balls arranged between said sleeves and engaging said raceways, and rollers arranged between said sleeves in alternation with said balls and circumferentially grooved between their ends to receive said balls, said rollers having circular end bearing surfaces engaging the outer and inner peripheral surfaces of said sleeves respectively at the opposite sides of said raceways, said sleeves having oppositely beveled surfaces facing outwardly at the sides of said raceways and said rollers having oppositely beveled inwardly facing surfaces at the sides of the grooves therein and engaging said beveled surfaces to assure proper alignment of the rollers with respect to said balls.

5. A grooved and beveled bearing roller for receiving axial and radial thrusts and split between its ends to provide identical halves, having concave inner surfaces terminating in beveled outer edges, said halves having axial openings, and a rivet passing through said openings and headed-over at its ends at the opposite ends of the roller to hold said halves together with said concave surfaces cooperating to provide a circumferentially extending groove.

6. A grooved and beveled bearing roller for receiving axial and radial thrusts and composed of identical parts formed with concave inner surfaces terminating in beveled outer edges and said parts provided with axial openings and a securing element passing through said openings for holding said parts together with said concave surfaces cooperating to provide a circumferentially extending groove.

7. A grooved and beveled bearing roller for receiving radial and axial thrusts and composed of identical parts formed with concave inner surfaces terminating in beveled outer edges and said parts provided with axial openings and a rivet passing through said openings and having a central enlargement intermediate said parts, said rivet being headed-over at its ends to secure said parts together with said concave surfaces cooperating with said enlargement to provide a circumferentially extending groove.

8. In a combined ball and roller bearing, concentric sleeves providing inner and outer raceways, a series of balls guided by said raceways, said sleeves having outwardly facing beveled surfaces at the sides of said raceways, and a series of rollers in alternation with said balls and of the same diameter as said balls, said rollers having annular grooves midway between their ends into which said balls project, and said rollers having inwardly facing beveled surfaces at the sides of said grooves and engaging said beveled sleeve surfaces for aligning said rollers with respect to said balls.

9. In a combined ball and roller bearing, concentric sleeves providing inner and outer raceways, a series of balls guided by said raceways, said sleeves having outwardly facing beveled surfaces at the sides of said raceways, and a series of rollers arranged in alternation with said balls and of the same diameter as said balls, said roller having annular grooves midway between their ends into which said balls project, and said rollers having inwardly facing beveled surfaces at the sides of said grooves and engaging said beveled sleeve surfaces for aligning said rollers with respect to said balls, and the axes of said balls and rollers lying in a common circle coaxial with said sleeves.

LEON E. SIMMONS.

REFERENCES CITED

The following references are of record in the file of this patent:

UNITED STATES PATENTS

| Number | Name | Date |
|---|---|---|
| 579,269 | Hent | Mar. 23, 1897 |
| 683,408 | Kempster | Sept. 24, 1901 |
| 997,920 | Keiper | July 11, 1911 |
| 1,289,062 | Westman | Dec. 24, 1918 |
| 1,415,694 | Perkins | May 9, 1922 |
| 2,037,074 | Griswold | Apr. 14, 1936 |
| 2,086,787 | Whiteley | July 13, 1937 |
| 2,132,249 | Van Pelt | Oct. 4, 1938 |
| 2,283,312 | Boice | May 19, 1942 |
| 2,297,817 | Truxell | Oct. 6, 1942 |